United States Patent [19]

Karwat

[11] 4,381,926
[45] May 3, 1983

[54] METHOD AND APPARATUS FOR REGULATING AMMONIA CONCENTRATION DURING SCRUBBING OF GASEOUS MIXTURES

[75] Inventor: Heinz Karwat, Pullach, Fed. Rep. of Germany

[73] Assignee: Linde Aktiengesellschaft, Fed. Rep. of Germany

[21] Appl. No.: 305,220

[22] Filed: Sep. 24, 1981

[30] Foreign Application Priority Data

Sep. 30, 1980 [DE] Fed. Rep. of Germany ....... 3036936

[51] Int. Cl.³ .................... B01D 53/14; B01D 19/00
[52] U.S. Cl. ........................................ 55/48; 55/51; 55/70; 55/73; 55/196; 55/228; 210/681
[58] Field of Search ............... 55/46, 48, 51, 70, 73, 55/89, 228, 196; 210/681

[56] References Cited

U.S. PATENT DOCUMENTS

| | | | |
|---|---|---|---|
| 3,475,330 | 10/1969 | Gilles | 210/681 X |
| 3,723,308 | 3/1973 | Breck | 210/681 |
| 3,899,312 | 8/1975 | Kruis et al. | 55/73 X |
| 3,910,777 | 10/1975 | Jakob | 55/48 |
| 3,948,621 | 4/1976 | Cocuzza et al. | 55/48 X |
| 3,948,769 | 4/1976 | Dobbs | 210/681 X |
| 4,002,565 | 1/1977 | Farrell et al. | 55/73 X |
| 4,050,909 | 9/1977 | Ranke | 55/48 X |
| 4,155,988 | 5/1979 | Karwat et al. | 55/73 X |
| 4,324,567 | 4/1982 | Ranke et al. | 55/51 X |
| 4,332,596 | 6/1982 | Ranke et al. | 55/18 |
| 4,332,598 | 6/1982 | Antonas et al. | 55/73 X |

FOREIGN PATENT DOCUMENTS

| | | | |
|---|---|---|---|
| 569160 | 1/1959 | Canada | 55/73 |
| 2759123 | 7/1979 | Fed. Rep. of Germany | 55/73 |
| 691168 | 10/1979 | U.S.S.R. | 55/73 |

*Primary Examiner*—Robert H. Spitzer
*Attorney, Agent, or Firm*—Lerner, David, Littenberg & Samuel

[57] ABSTRACT

Methods and apparatus for scrubbing gaseous mixtures containing ammonia are disclosed in which the gaseous mixtures are contacted with methanol in a scrubbing column to remove any acidic gases therefrom, the methanol is separated from the acidic gases and recirculated, and at least a portion of the methanol is contacted with an ion exchange material so as to remove at least a portion of the ammonia therefrom. In one embodiment of the invention, the method and apparatus also includes addition of methanol to the gaseous mixture prior to contacting in the scrubbing column so as to produce a methanol-water mixture with any water contained in the gaseous mixture and prevent the icing thereof, and includes separating the methanol-water mixture from the gaseous mixture prior to contacting with the scrubbing column as well as separating the methanol from the water and recirculating the methanol.

23 Claims, 1 Drawing Figure

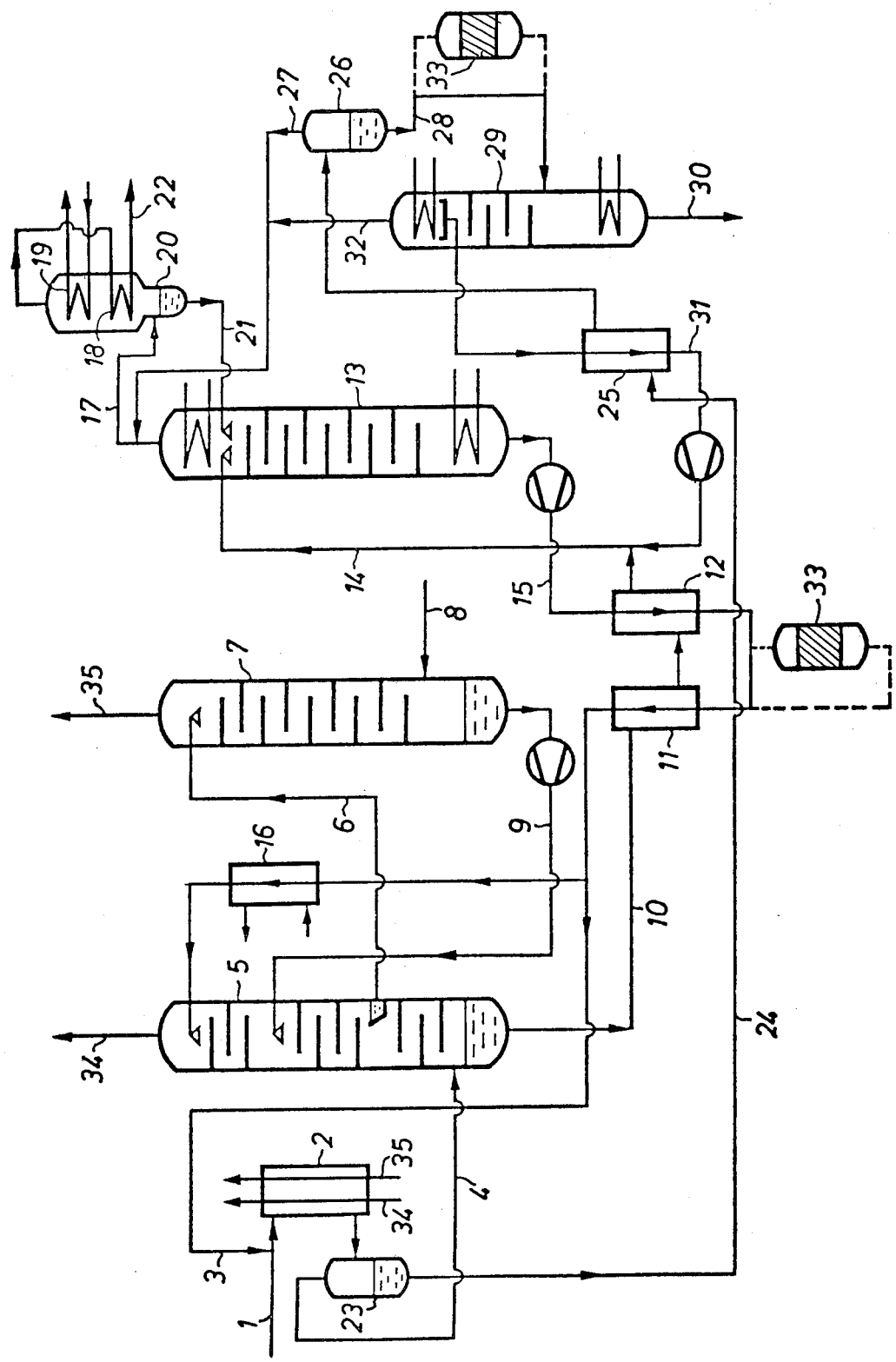

METHOD AND APPARATUS FOR REGULATING AMMONIA CONCENTRATION DURING SCRUBBING OF GASEOUS MIXTURES

FIELD OF THE INVENTION

The present invention relates to methods employing methanol for scrubbing gaseous mixtures. More particularly, the present invention relates to the use of methanol in regenerative methods for scrubbing acidic gases from gaseous mixtures and/or for the prevention of icing prior to scrubbing. Still more particularly, the present invention relates to methods and apparatus for the regulation of the ammonia concentration in methanol used in such processes.

BACKGROUND OF THE INVENTION

In the manufacture of industrial gases from raw gas mixtures the acidic components, and in particular $CO_2$ and $H_2S$, must be separated therefrom. The methanol scrubbing method has proved to be particularly advantageous in that the acidic components are removed at temperatures down to about $-70°$ C. and at pressures to about 80 bar utilizing methanol.

The raw gaseous mixtures which are to be cleaned also generally contain traces of ammonia which tend to concentrate therein due to their high solubility in methanol. Such ammonia concentrations can be desirable, for example as is shown in DE-OS 27 59 123. In patents such as this methods are shown which employ physical scrubbing substances, such as methanol, to which are added small amounts of ammonia, i.e., about 0.05 to 0.5 weight percent. Scrubbing with such additions of ammonia therein thus represents a combined physical-chemical scrubbing so that a relatively smaller amount of scrubbing substance therefore needs to be used.

Such methods, however, are only utilized intelligently when they employ constant ammonia concentrations. However, often the ammonia concentration in the methanol becomes too great so that when carbon dioxide is also present solid precipitates of ammonia carbaminate are formed, particularly in the methanol cold trap for the hydrogen sulphide fraction, and/or the equipment used for heating is influenced and the operation of the scrubbing process can then be disturbed.

It is therefore an object of the present invention to present a method which insures a trouble free and safe flow of the scrubbing methanol used for the removal of these acidic gases from the gaseous mixtures by means thereof.

SUMMARY OF THE INVENTION

In accordance with one aspect of the present invention, a method has now been discovered for scrubbing such gaseous mixtures containing ammonia including contacting the gaseous mixture with methanol in a scrubbing column to remove acidic gases therefrom, separating the methanol from the acidic gases, recirculating the methanol, and contacting at least a portion of the methanol with an ion exchange material so as to remove at least a portion of the ammonia therefrom.

In accordance with one aspect of the method of the present invention, when the gaseous mixture contains water methanol is added to the gaseous mixture prior to its contacting with methanol in the scrubbing column so as to produce a methanol-water mixture and prevent icing of the water. A preferred embodiment of this method includes separating the methanol-water mixture from the gaseous mixture prior to contacting of the gaseous mixture and methanol in the scrubbing column, separating the methanol from the water, and recirculating the methanol.

In accordance with another embodiment of the method of the present invention, the contacting of the methanol with the ion exchange material is carried out subsequent to the separation of the methanol from the acidic gases.

In accordance with a preferred embodiment of the method of the present invention, any dissolved gases are separated from the methanol-water mixture, and the methanol is contacted with the ion exchange material subsequent to separation of those dissolved gases from the methanol-water mixture. Generally these dissolved gases comprise carbon dioxide. In a preferred embodiment, contact of the methanol with the ion exchange material is carried out prior to separation of the methanol from the water.

In a preferred embodiment of the method of the present invention, contact of the methanol with the ion exchange material takes place at temperatures of between about 10° and 50° C., preferably between about 20° and 40° C.

In accordance with a preferred embodiment of the method of the present invention the ammonia is removed from the methanol in order to leave a residual ammonia content therein of between about 300 and 2000 ppm, preferably between 300 and 500 ppm. Preferably, the ion exchange material is an acryl-acid resin, and preferably it is regenerated, such as by contacting with sulfuric acid.

In accordance with the apparatus of the present invention there is provided a scrubbing column for contacting the gaseous mixture with methanol in order to remove acidic gases from the gaseous mixture, a methanol recovery column for separating the methanol from the acidic gases, recirculation means for recirculating the separated methanol, and ion exchange means for contacting at least a portion of the methanol with an ion exchange material in order to remove at least a portion of the ammonia therefrom.

In accordance with one embodiment of the apparatus of the present invention precooling means are provided for cooling the gaseous mixture prior to its entry into the scrubbing column.

In accordance with a preferred embodiment of this aspect of the apparatus of the present invention, heat exchange means are provided for heating the methanol prior to its contact in the ion exchange means to temperatures of between about 10° and 50° C., preferably between about 20° and 40° C. Preferably, the heat exchange means provide for heat exchange between the methanol separated in the recovery column and the recirculating methanol.

By using the method of the present invention the ammonia is removed from the methanol in a simple manner. Thus, the forming of solid precipitates of ammonia compounds is suppressed and the heat balance of the scrubbing process is no longer disturbed by reaction of the ammonia with carbon dioxide and hydrogen sulphide.

The present inventive method is utilized to advantage by routing only a portion of the total circulating methanol to the ion exchanger so that the ammonia is preferably removed subsequent to separation of the additional dissolved gas particles, such as particularly after the CO₂ and H₂S separation, or before water separation from methanol.

BRIEF DESCRIPTION OF THE DRAWING

The drawing is a schematic representation of the method and apparatus of the present invention.

DETAILED DESCRIPTION

The present invention may be more fully understood with reference to the drawing and the detailed discussion thereof which now follows. Referring to the drawing, in line 1 there is provided a flow of about 100,000 Nm³/h of the raw gas which is to be scrubbed, and which generally has a temperature of about 30° C. and a pressure of about 70 bar. This flow of gas passes through the precooler 2. The raw gas comprises mainly H₂ and CO₂, but may also contain CO, H₂S and about 80 kg/h of water, as well as traces of ammonia, generally about 3 vppm.

In the precooler 2 the gas, saturated with water, is cooled to about −30° C. by means of a portion of the gas returning from the scrubbing system through pipes 34 and 35, which will be described in more detail below. In order to prevent the formation of a layer of water ice therein, about 160 kg/h of methanol are injected through pipe 3 into the precooler 2, the methanol from pipe 3 having been returned from the consecutive methanol scrubbing system. The precooled raw gas then is conveyed to separator 23, and then through pipe 4 into a methanol scrubbing column 5 for removal of the the acidic components, e.g., CO₂ and H₂S. In the lower portion of the methanol scrubbing column 5 the sulphur compounds are washed out with a partial stream of methanol. In the middle portion of scrubbing column 5 coarse scrubbing of the CO₂ takes place with the largest amount of methanol, while in the upper portion of scrubbing column 5 fine scrubbing of the CO₂ takes place. In the middle portion of scrubbing column 5 washing takes place with partially regenerated methanol, while in the upper portion of the column completely regenerated methanol is utilized. The scrubbed gas then flows through pipe 34 to precooler 2 and can then be subjected to additional processing.

Methanol charged with CO₂ is routed through pipe 6 to recovery column 7 and there stripped of CO₂ with an auxiliary gas which enters through pipe 8. The stripped methanol then returns to scrubbing column 5 through pipe 9. The released gases, i.e., H₂, CO and CH₄, as well as CO₂ and the stripping gas, are drawn off at the top of column 7 and then flow through pipe 35 to precooler 2.

The methanol containing H₂S and CO₂ which collects in the sump of the scrubbing column 5 then passes through pipe 10 and heat exchangers 11 and 12 into recovery column 13. In heat exchanger 11 this methanol stream is heated to approximately ambient temperatures, and in heat exchanger 12 it is heated to temperatures of approximately 65° C. It then is passed via pipe 14 to recovery column 13. In recovery column 13 the methanol is completely de-gassed by cooking, and the thus regenerated methanol from the sump of the recovery column 13 is withdrawn through pipe 15 and cooled in heat exchanger 12 to about 30° C. Finally, in heat exchanger 11 it is cooled to about −10° C. After it is further cooled to about −40° C. in the freezing mixture evaporator 16 the methanol can then be returned to the scrubbing column 5.

The acidic gases, i.e., H₂S and CO₂ withdrawn from the head of recovery column 13, then pass through pipe 17 into heat exchanger 18, where they are cooled by countercurrent flow therein. In the freezing mixture evaporator 19 these gases are cooled to about −40° C. so that any methanol carried along therein condenses out and collects in separator 20. This arrangement, including pipe 17, heat exchanger 18, freezing mixture evaporator 19, separator 20, and pipe 21, represents the methanol cold trap. The condensate therefrom is returned through pipe 21 to the recovery column 13. After heating in the countercurrent flow of exchanger 18 the CO₂ and H₂S fraction leaves the system through pipe 22.

The cold (i.e., at about −30° C.) and water-laden methanol injected into the precooler 2 enters the separator 23, and through pipe 24 is then delivered to separator 26 subsequent to its heating to ambient temperature in the counterflow heat exchanger 25, where the main portion of the dissolved gases, particularly CO₂, are separated by expansion therein. These separated gases are mixed in pipe 27 with the CO₂ and H₂S fraction removed from recovery column 13. The methanol-water mixture separated therein passes through pipe 28 for delivery to the steam heated and water cooled water-methanol separating column 29. The water is withdrawn through pipe 30 at the bottom thereof, and the methanol, through heat exchanger 25 and pipe 31, from the head of column 29, for delivery to the methanol recovery column 13. Inert gases can leave column 29 through pipe 32.

The ammonia which is carried along in the raw gas partially dissolves in the injected methanol in precooler 2 and is carried along with the methanol through pipe 24 to the methanol-water separating column 29. From that column it is expelled by the sump heater and thus goes to the scrubbing circulation with the methanol through pipe 31. However, a portion of the ammonia remains in the raw gas and thus goes through the scrubbing column 5 with the scrubbing methanol in which it is dissolved, i.e., into the scrubbing circulation. From there, a portion of the ammonia goes with the methanol to the cold trap through recovery column 13 in pipe 17. In the cold trap the ammonia, together with the separated CO₂ from the raw gas, forms ammonium carbaminate, which precipitates out as a solid by exceeding the solubility limit of the methanol, preferably in the heat exchanger 19. Therefore, the amount of ammonia must be limited to a concentration such that the solubility limit in the methanol condensate is not exceeded.

Therefore, the methanol is routed in accordance with this invention over a methanol resistant ion exchanger 33, and preferably a resin of the acryl type. This ion exchanger 33 operates particularly effectively at temperatures of between about 10° and 50° C., preferably between about 20° and 40° C. For this reason, and in addition because not the total amount of ammonia needs to be removed from the methanol, pipes 28 and 15 (shown by dotted lines in the drawing) are particularly suited for the embedment of the ion exchanger 33.

In both cases the temperature is in the desired range of the methanol contaminated with ammonia so that the ammonia can be removed effectively by the ion exchanger. However, embedment at other locations is also possible, for example in the head portion of the methanol-water separating column 29 or in the condensate stream of pipe 21, as long as possibilities are provided for the degassification of the dissolved CO₂ and H₂S portions and/or at least a portion of the methanol stream is heated as required. One liter of the resin normally adsorbs about 2.5 grams of ammonia in the swollen condition. At the given values this corresponds to a consumption of about 21 liters of the ion exchange material per hour. This material can be arranged in a container with a bed height of about 800 mm.

For regeneration of the ion exchanger it can be taken out of operation and the scrubbing system can then be operated without ammonia removal during such regeneration. This is again possible in view of the fact that the ammonia does not have to be completely removed from the methanol. As an alternative, however, one can also operate two ion exchangers so that one regenerates while the other one is being charged. For regeneration of the ion exchanger it is filled with water from the bottom and then, for about an hour, 5% sulfuric acid solution, for example, can be introduced therein. Subsequently the ion exchanger can be rinsed with water again until practically no sulphate is present in the run-off. It is then ready for reuse.

It will be understood that the embodiment described herein is merely exemplary and that a person skilled in the art may make many variations and modifications without departing from the spirit and scope of the invention. All such modifications and variations are intended to be included within the scope of the invention as defined in the appended claims.

What is claimed is:

1. A method for scrubbing gaseous mixtures containing ammonia and acidic gases which comprises contacting said gaseous mixture with methanol in a scrubbing column so as to remove a portion of said acidic gases therefrom and produce a methanol stream containing at least a portion of said ammonia, separating said methanol stream containing said at least a portion of said ammonia from said acidic gases, contacting at least a portion of said methanol stream with an ion exchange material so as to remove at least a portion of said ammonia therefrom, and recirculating said methanol stream to said scrubbing column.

2. The method of claim 1 wherein said gaseous mixture includes water, including adding said methanol to said gaseous mixture prior to contacting said gaseous mixture with said methanol in said scrubbing column so as to produce a methanol-water mixture and prevent the icing of said water.

3. The method of claim 2 including separating said methanol-water mixture from said gaseous mixture prior to contacting of said methanol with said gaseous mixture in said scrubbing column, separating said methanol from said water, and recirculating said methanol to said scrubbing column.

4. The method of claim 1 wherein said contacting of said methanol with said ion exchange material is carried out subsequent to said separation of said methanol from said acidic gases.

5. The method of claim 3 wherein said methanol-water mixture includes dissolved gases therein, and including separating at least a portion of said dissolved gases from said methanol-water mixture, and further wherein said contacting of said methanol with said ion exchange material is carried out subsequent to said separation of said dissolved gases from said methanol-water mixture.

6. The method of claim 5 wherein said dissolved gases comprise $CO_2$.

7. The method of claim 5 wherein said contacting of said methanol with said ion exchange material is carried out prior to said separation of said methanol from said water.

8. The method of claim 1 wherein said contacting of said methanol with said ion exchange material takes place at a temperature of between about 10° and 50° C.

9. The method of claim 1 wherein said contacting of said methanol with said ion exchange material takes place at a temperature of between about 20° and 40° C.

10. The method of claim 1 wherein said ammonia is removed from said methanol so as to leave a residual ammonia content therein of between about 300 and 2,000 ppm.

11. The method of claim 1 wherein said ammonia is removed from said methanol so as to leave a residual ammonia content therein of between about 300 and 500 ppm.

12. The method of claim 1 wherein said ion exchange material comprises an acryl-acid resin.

13. The method of claim 1 including regenerating said ion exchange material.

14. The method of claim 13 wherein said regeneration of said ion exchange material comprises contacting said ion exchange material with sulfuric acid.

15. Apparatus for scrubbing gaseous mixtures containing ammonia and acidic gases comprising a scrubbing column for contacting said gaseous mixtures with methanol so as to remove a portion of said acidic gases from said gaseous mixture and produce a methanol stream containing at least a portion of said ammonia, a methanol recovery column for separating said methanol stream containing said at least a portion of said ammonia from said acidic gases, first methanol delivery means for delivering said methanol stream containing said at least a portion of said ammonia from said scrubbing column to said methanol recovery column, ion exchange means for contacting at least a portion of said methanol stream with an ion exchange material so as to remove at least a portion of said ammonia therefrom, second methane means for delivery means for delivering said methanol stream containing said at least a portion of said ammonia from said methanol recovery column to said ion exchange means, and recirculation means for recirculating said separated methanol to said scrubbing column.

16. The apparatus of claim 15 including precooling means for cooling said gaseous mixture prior to its entry into said scrubbing column.

17. The apparatus of claim 16 including heat exchange means for heating said at least a portion of said methanol prior to its contact in said ion exchange means to a temperature of between about 10° and 50° C.

18. The apparatus of claim 16 including heat exchange means for heating said at least a portion of said methanol prior to its contact in said ion exchange means to a temperature of between about 20° and 40° C.

19. The apparatus of claim 17 or 18 wherein said heat exchange means is adapted for heat exchange between said methanol separated in said recovery column and said recirculating methanol.

20. The apparatus of claim 16 or 17 wherein said gaseous mixture comprises water and including methanol addition means for adding methanol to said gaseous mixture prior to said scrubbing column so as to produce a methanol-water mixture and prevent the icing of said water.

21. The apparatus of claim 20 including separation means for separating said methanol-water mixture from said gaseous mixture prior to said scrubbing column, and water separation means for separating said water from said methanol.

22. The apparatus of claim 17 wherein said heat exchange means includes a pair of heat exchangers, and said ion exchange means is located between said pair of heat exchangers.

23. The apparatus of claim 21 including gas separation means for separating any dissolved gases from said methanol-water mixture, and wherein said ion exchange means is located subsequent to said gas separation means and prior to said water separation means.

* * * * *